United States Patent [19]

McKeon et al.

[11] Patent Number: 5,991,537
[45] Date of Patent: Nov. 23, 1999

[54] VXI TEST EXECUTIVE

[75] Inventors: Brian T. McKeon; Mark C. Larson, both of Newport; Douglas H. Sherman, Cranston, all of R.I.

[73] Assignee: The United States of America as represented by the Secretary of the Navy, Washington, D.C.

[21] Appl. No.: 08/969,530

[22] Filed: Sep. 16, 1997

[51] Int. Cl.$^6$ .................................................... G06F 9/45
[52] U.S. Cl. ........................ 395/704; 395/704; 395/705
[58] Field of Search ...................... 395/701, 703, 395/704, 700, 705; 702/120; 345/349, 333; 706/47; 714/28

[56] References Cited

U.S. PATENT DOCUMENTS

| | | | |
|---|---|---|---|
| 4,901,221 | 2/1990 | Kodosky et al. | 345/348 |
| 4,914,568 | 4/1990 | Kodosky et al. | 345/349 |
| 5,319,645 | 6/1994 | Bassi et al. | 714/38 |
| 5,539,907 | 7/1996 | Srvastave et al. | 395/705 |
| 5,600,789 | 2/1997 | Parker et al. | 714/38 |
| 5,680,542 | 10/1997 | Mulchandani et al. | 714/28 |
| 5,689,684 | 11/1997 | Mulchandani et al. | 395/500.44 |
| 5,715,373 | 2/1998 | Desgrousilliers et al. | 706/47 |
| 5,724,273 | 3/1998 | Desgrousilliers et al. | 702/120 |
| 5,754,755 | 5/1998 | Smith | 395/183.14 |
| 5,790,117 | 8/1998 | Halviatti et al. | 345/333 |

OTHER PUBLICATIONS

Sefika et al, "Monitoring compliance of a software system with its high level designe models", Proc of ICSE, IEEE, pp. 387–396, 1996.

Ostrand et al, "A visual test devlopment environment for GUI systems", ISSTA ACM pp. 82–92, Aug. 1998.

Goforth et al, Implemenation of an automated EMS optimization program using as embeded expert system, ACM pp. 349–352, 1992.

Stocks et al, Test templets a specification based testing framework:, IEEE pp. 405–414, 1993.

Kasik et al, "Toward automatic generation of novice user test scripts", CHI Conf. proc. in human factor in computing sys, pp. 244–251, 1996.

*Primary Examiner*—Tariq R. Hafiz
*Assistant Examiner*—Anil Khatri
*Attorney, Agent, or Firm*—Michael J. McGowan; Robert W. Gauthier; Prithvi C. Lall

[57] ABSTRACT

A system is provided for developing program test sets with test hardware conforming to well known test industry standards, such as VXI, VME and GPIB standards. The system has a computer with a display console. After initialization and password checks, the console displays a front panel from which a user chooses the instruments, switches, connections, inputs, outputs, etc. which make up the program test set. As each choice is made, the system generates test script corresponding to the choice. The system then uses the test script, or macro, to generate the graphical representation of the component and its connections on the display. The graphical displays are standardized for each functional component or operation of a program test set, as well as being standardized between program test sets. The macros further allow a program test set to be more efficiently developed by coding macros rather than by developing graphical displays. The combined macros for the entire test set provide written documentation for the program test set, allowing for easy configuration management of the program test set.

19 Claims, 2 Drawing Sheets

VXI TEST EXECUTIVE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1). Field of the Invention

The present invention relates generally to systems for modeling test processes, and more particularly to computer systems for development of program test sets.

(2). Description of the Prior Art

In testing of highly sophisticated products such as automotive subassemblies, airframe components or weapons systems, it is necessary to provide a wide variety of instruments to collect the necessary test data from the environment. Computer control of instrumentation has become increasingly desirable in view of the increasing complexity and variety of instruments available for use. Traditional users of instrumentation are often not highly trained in programming techniques necessary to implement such computer controlled instrumentation systems. Typically, it is necessary to obtain the services of a programmer to write software for control and analysis of instrumentation data, resulting in development delays and additional costs. To this end, systems have been developed which aid in programming a computer system to electronically model an instrumentation system or, more generally, a process characterized by one or more input variables and one or more output variables. U.S. Pat. No. 4,914,568 to Kodosky et al. provides such a system for modeling a process and developing program test sets. The Kodosky et al. system includes an editor for displaying diagrams and constructing execution instructions. The diagrams graphically display procedures by which the input variables can produce the output variables. When a procedure is chosen, execution instructions are constructed within a computer which characterize an execution procedure which substantially corresponds to the displayed procedure. The system also includes and execution subsystem which assigns respective values for the input variables and executes the execution instructions to produce respective values for the output variables. When used to develop an instrumentation system, the input and output variables correspond to the environmental data collected by the instruments and the test data from the instruments, respectively. In this manner, the Kodosky et al. system behaves as a virtual instrument (VI). U.S. Pat. No. 5,481,741 to McKaskle et al. recites a system wherein the user can programmatically and interactively access various parameters of controls or indicators and programmatically make changes that affect the output or appearance of controls and indicators. In conjunction with the Kodosky et al. system, the user is able to control the attributes of the display of the output variables during the execution of a VI, such as color of the display, visibility of the control, scales or cursor positions, etc. The user is also able to interactively select points from one VI display as input to additional VI's. While such systems have greatly increased the efficiency of instrumentation system development and have made the use of VI's more flexible, the graphical nature of the user interface presents some problems. For example, configuration management, or the ability to ensure that changes made from one instrumentation configuration to another are properly documented, is virtually impossible without visually comparing the graphical diagrams presented on the screen. Also, differing graphical displays may in actuality provide for identical functional operations. This may be the case where the locations, but not the connections, of various components are moved within the graphical display. Further, for large complex program test sets, the construction of the large number of graphical diagrams required becomes cumbersome and tedious.

SUMMARY OF THE INVENTION

Accordingly, it is an object of the present invention to provide a system for modeling a process for which configuration management can be easily accomplished.

Another object of the present invention is to provide a system for modeling a process having standardized graphical representations of functional operations.

Still another object of the present invention is to provide a system for modeling a process which is easy to use for large complex test sets.

Other objects and advantages of the present invention will become more obvious hereinafter in the specification and drawings.

In accordance with the present invention, a system is provided for developing program test sets with test hardware conforming to well known test industry standards, such as IEEE 1155-1992 Standard for VME Bus Extensions for Instrumentation: VXI Bus; ANSI/IEEE 1014-1987 Standard for a Versa Modula Europa Bus: VME Bus; and ANSI/IEEE 488.1-1987 Standard for a General Purpose Interface Bus: GPIB. The system has a computer with a display console. After initialization and password checks, the console displays a front panel from which a user chooses the instruments, switches, connections, inputs, outputs, etc. which make up the program test set. As each choice is made, the system generates test script corresponding to the choice. For example, upon the choice of a voltmeter, the system displays a menu of available voltmeters to allow the user to input the specific characteristics of the voltmeter chosen, such as the voltage to be applied and the input and output nodes to which the voltmeter connects, and the system then converts this user data to test script, or macro, describing the voltmeter. The system then uses the macro to generate the graphical representation of the voltmeter on the display, similar to the prior art graphical display. In this manner, each component of the program test set has an associated macro which generates the graphical display for the component. Unlike the prior art which relied solely on graphical displays, the test script macros of the current system allow for easy configuration management of a program test set. Text script comparison between various program test sets, or between different versions of the same program test set, is easily accomplished with well known text comparators. Since the macros generate the graphical displays, the graphical displays are standardized for each functional component or operation of a program test set, as well as being standardized between program test sets. Thus, for the same functional component, the graphical display is independent of the system operator and the locations of the components and connections within the graphical display. Further, a program test set may be developed by coding macros rather than developing graphical displays. For large, complex program test sets, direct coding has been found to be more efficient than graphical representation.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
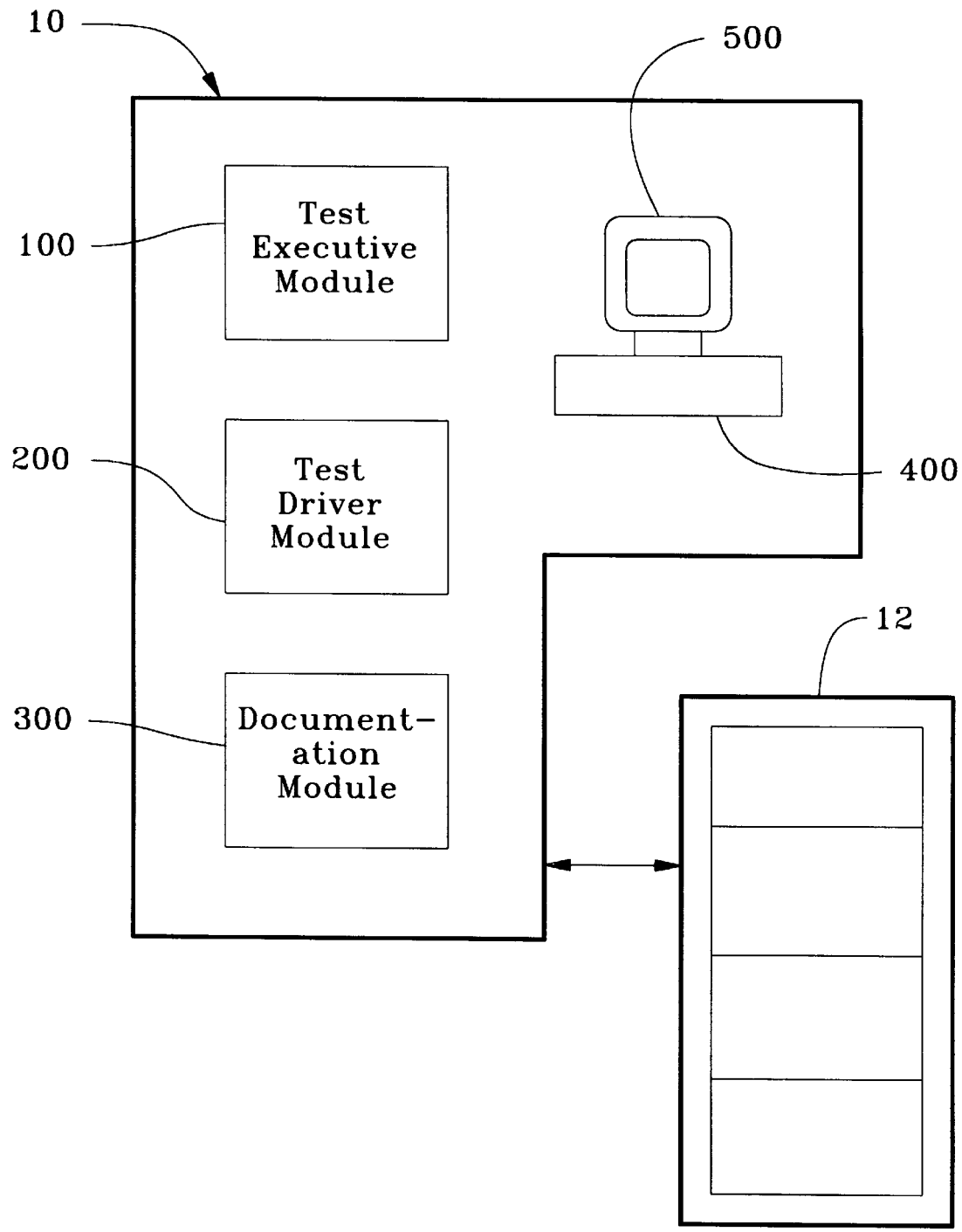
FIG. 1 is a block diagram of the system of the current invention.
Figure 2:
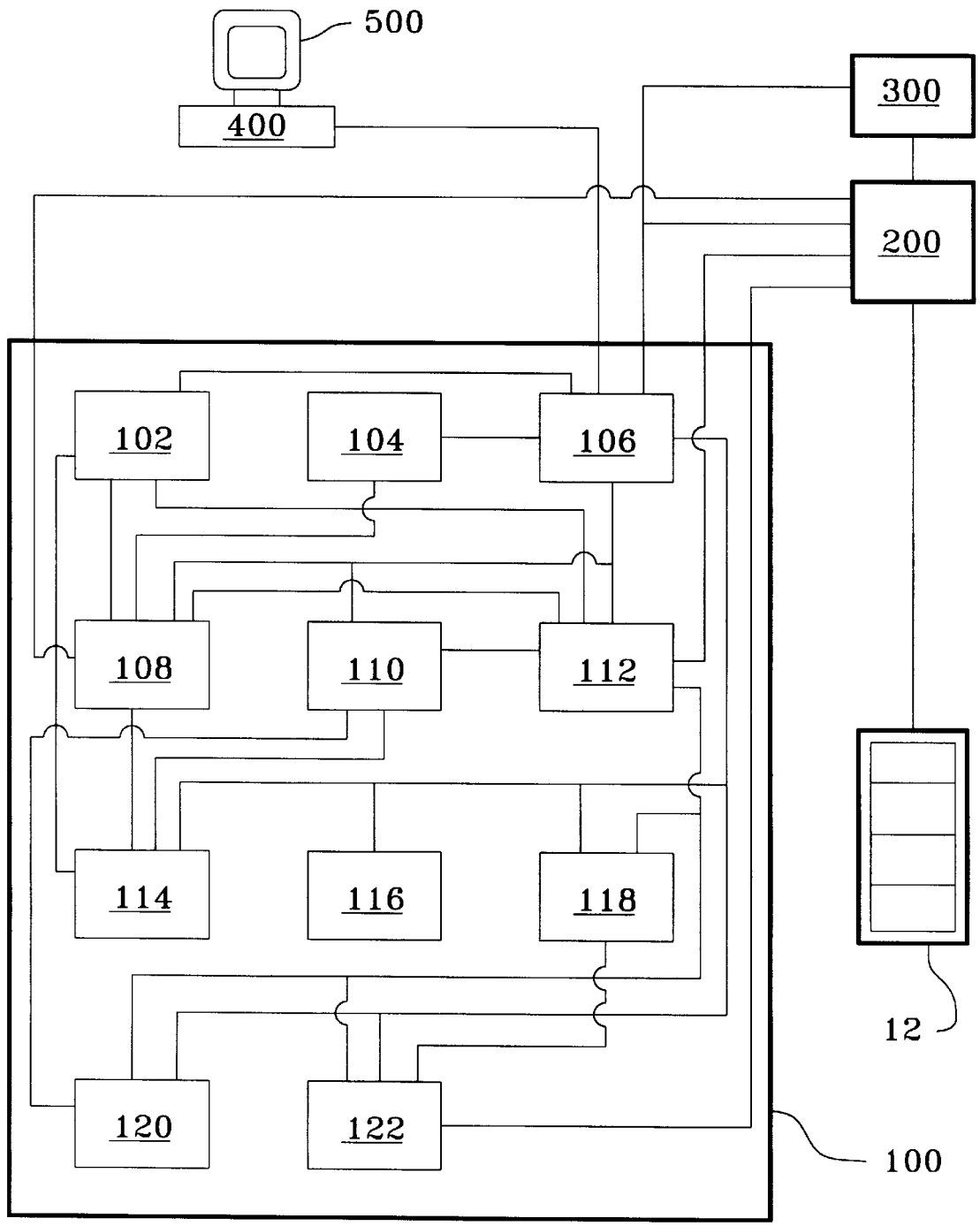
FIG. 2 is a block diagram of the test executive module of the system of the current invention.

Referring now to FIG. 1, there is shown a block diagram of the program test set development system 10. System 10 interfaces with test set hardware chassis 12. Hardware chassis 12 can be any well known test set hardware which would include various instruments which can be interconnected to a unit under test (UUT) and programmed to provide inputs to and take measurements of the UUT. System 10 includes test executive module 100, test driver module 200, documentation module 300, computer 400 and display 500. Computer 400 contains the operating system and hardware for running modules 100, 200 and 300. Operator interface is provided via display 500 and standard keyboard and mouse interfaces for the operating system of computer 400. Test executive module 100 handles editing and preprocessing of test script files used to program the instruments within test set hardware chassis 12. It further handles all operator interactions with hardware chassis 12, performs automated testing, compares received data with expected values, displays, logs and prints results of tests, manages information regarding the UUT being tested and also restricts access to authorized operators. Referring now additionally to FIG. 2, the components of test executive module 100 are shown. Test executive module 100 includes password manager module 102, test set mating verification module 104, user interface module 106, automated test performance module 108, file manager module 110, test script module 112, test result module 114, self test module 116, instrument availability module 118, test script availability module 120 and driver availability module 122. When system 10 is initialized via computer 400, password manager module 102 displays a LOGON screen at display 500 and awaits user name and password inputs. Once it receives this input, password manager module 102 checks the user name and password against a predefined password list, allows for user password changes and provides access to system 10 at various levels depending on user clearance. For example, the preferred embodiment of system 10 has four user clearance levels. An operator clearance allows system access to run a pre-programmed test set. A technician clearance allows the user to change test parameters during running of a pre-programmed test set. A system clearance allows the user to make changes to the configuration of hardware chassis 12 within system 10 and to the password list. A developer clearance allows the user full access to all modules within system 10. Password manager module 102 outputs the user level to user interface module 106, automated test performance module 108, test script module 112 and test result module 114, as well as outputting the user name to test result module 114.

The test set mating verification module 104 verifies that system 10 and hardware chassis 12 are properly interfaced and prevents running any automated tests or operations requiring the interface to be in place. The output of verification module 104 is therefor passed to interface module 106 and automated test performance module 108. Interface module 106 provides for startup, initialization, cleanup and shutdown of system 10 as well as providing the main user interface and control of system 10. At startup and initialization, interface module 106 starts password module 102, sets the initial operating mode and initial controls and functions available to the user depending on user input and clearance level, starts the instrument availability module 118, the test script availability module 120 and the driver availability module 122, and sets system 10 configuration based on saved configuration data. In the preferred embodiment, system 10 has three operating modes: a run mode; an edit mode; and an interactive mode. At the operator level, only the run mode is activated such that the user may run a pre-programmed test set. At the technician and system levels, the interactive mode is also available such that a technician level user can change test parameters and a system level user can additionally reconfigure hardware chassis 12. The edit mode is available at the developer level in order to add, delete, or make changes to, instrument test scripts and drivers as will be further explained for test script module 112 and test driver module 200. When exiting system 10, interface module 106 performs a cleanup and shutdown routine closing all open files, prompting the user to save files when necessary, processing shutdown sequences for all open instruments of hardware chassis 12, and saving configuration data for use when system 10 is again started.

Once the system has been initialized and the user level determined, interface module 106 serves as the main user interface for system 10, displaying toolbars and pull down menus for user inputs. Interface module 106 also displays and maintains a status bar containing data on the user name, test name, operating mode and, during a test run, the current operation being executed, e.g., the test script line number. In addition, interface module 106 displays the test script display and instrument chassis 12 graphics to the user as will be further described. Interface module 106 loops continuously while awaiting user input via computer 400 mouse or keyboard. When user input is detected, either through a keyboard stroke or a mouse button press, interface module 106 calls the corresponding module to perform the requested operation. File manager module 110 is called for file function operations such as starting a new file, opening an existing file, saving files, closing files and getting the configuration file. Modules 118, 120 and 122 are called upon queries for availability of instruments, test scripts/macros and drivers, respectively. The automated test performance module 108 is called for test execution operations including starting, continuing, pausing and stopping a test run, and is also called when changing the run mode for system 10. The test script module 112 is called during test script editing operations. Test result module 114 is called for viewing or printing test results. Password manager module 102, test set mating verification module 104 and self test module 116 can also be called via user inputs for password options, a verification request and a self test request, respectively. The interface module 106 can also call driver module 200 upon a user request to display hardware chassis 12 with available instruments. In addition, interface module 106 calls documentation module 300 upon a user request for help.

The file manager module 110 processes all file function operations. Upon receipt of a new file request, a new file is created and control is transferred to test script module 112 for adding and editing test script. Upon receipt of an open file request, the file manager module reads the list of files available from test script availability module 120, sends the list to user interface module 106 for display and prompts the user to select a file. The selected test script file is opened and the data sent to test script module 112 awaiting editing or execution. Upon receipt of a save file request, the user is prompted to save the current file either as test script or as a macro with the current name or a new name. When a configuration file request is received, file manager module 110 reads the configuration file and outputs the configuration file data for editing. On receipt of a close current file request, the user shall be prompted to save the currently displayed file as previously described for a test script file or, in the case of the configuration file, as the new configuration file. The file is then closed and removed from the display.

Test script module 112 receives the test script file data from file manager module 110, displays the test script and awaits an editing or pre-processing command from automated test performance module 108. Upon receipt of an editing command, the user can cut, paste and copy test script as necessary as well as maneuver through the text script. Test script can also be copied from driver module 200. In creating a new test script file, the file data from file manager module 110 includes only the file name and the test script file is blank. The user adds test script to the file as was done in editing an existing file. Additions or changes to the test script file are passed to the test script display. Test script module 112 serves as an assembler wherein test script commands are interpreted by test script module 112 and converted to the test set development programming language used to control instrument chassis 12. In current test set development systems, the user builds a test set by choosing components from pull-down icons and graphically makes the connections between the components. The test set representation within the system changes depending on the routing of the connection chosen. Further, the graphical display is the only documentation for the component and connection configuration chosen. In system 10, the connections between components are software driven, e.g., by a CONNECT command, such that the representation within the system of a connection between a first component and a second component is not dependent on a connection path graphically inserted by the user. Additionally, the test script of system 10 provides written documentation of the components and connections of the test set.

Upon receipt of a pre-processing command, the current test script file data is checked to ensure that each entry in each test script line is valid. Entries are checked for proper sequencing, commands are checked against the list of valid key words and arguments are checked for proper syntax and format. LOOP and ENDLOOP arguments are checked for proper alignment and branch arguments are checked to ensure the pointer is valid. Each driver and macro specified is compared with corresponding lists from instrument availability module 118, test script availability module 120 and driver availability module 122. Any errors detected are displayed to the user.

Automated test performance module 108 is called for execution of test script files. Upon receipt of an execute test request, automated test performance module 108 operations sends a pre-processing command to test script module 112. If no errors are received, automated test performance module 108 sequentially processes each test script line of the active test script file until the end of the file is reached, or until a pause or stop test command is received. A start or continue test command resumes execution. Execution of the test script file can proceed in either a continuous mode, as just described, or in a step mode, wherein execution is paused after each step and the user is given a choice to continue execution at the next step or to halt execution. The step mode would normally be used when editing a test script. The user can view the results of each step and changes can be made as appropriate. The mode of execution is chosen through user interface module 106. When the test script requires instrument operation or analysis, automated test performance module 108 calls the appropriate instrument driver from test driver module 200. The results are received from test driver module 200 and passed to test result module 114.

Test results module 114 receives test result data from automated test performance module 108 and formats the data for display or printing output. The user can choose the output format to have either the complete test results data displayed or printed or only a summary of the test results data. Test results module 114 is called from interface module 106 when the results are to be displayed on the screen or printed. While a test script is being executed, test results module 114 displays the results interactively and logs the test results data for each step into a test results log file. The log file also contains date, time, user information, UUT information and other pertinent system information. The user may also open a results log file via a call to test results module 114 from file manager module 110 and write to a comments section of the log file.

Self test module 116 checks the system 10 configuration file to determine if all files and resources listed in the configuration file exist. An error message is displayed if files or resources do not exist or an error occurs in a file or resource path. Instrument availability module 118 processes a resource table from the test set configuration file, verifies the presence and address of each instrument in the table, creates a list of available instruments and provides a warning or error message when an instrument is missing or is not connected properly. Test script availability module 120 reads all test script files and creates a list of files available. Driver availability module 122 processes the instruments available list generated by instruments availability module 118, verifies that test driver module 200 contains the necessary drivers for the instruments available, creates a list of available drivers and provides an error message when a necessary driver is missing.

Test driver module 200 operates the instruments within the test set. Test driver module 200 receives a call from automated test performance module 108 in the form of a test script string, decodes the string and runs the specified driver. If the decoding is unsuccessful, an error message is provided for display via interface module 106. In an edit mode, test driver module 200 displays the front panel controls of the instrument corresponding to the driver such that instrument parameters may be changed. Editing changes may be saved or canceled and the instrument run with the edited parameters. Saved changes are reflected in the test script file for that instrument. The results of the instrument run or measurements from the instrument are passed back to automated test performance module 108. The drivers within test driver module 200 are typically standard industry drivers modified as necessary to interface with the test script commands.

Documentation module 300 provides context sensitive help to the user by maintaining the current state of system 10, i.e., the function being performed, and displaying the corresponding help topic file upon a user request for help. Documentation module also provides the user with a description of the use and operation of each front panel control displayed by driver module 200.

The functions of the modules of system 10, such as file management, file processing, data display, help files, etc., are well known functions in the test set development art and can be coded in any well known programming language for test set development. In the preferred embodiment of system 10, the modules are programmed in the LabVIEW language by National Instruments. Test script module 112 serves as an assembler to process the test script files into the programming language used to describe instrument configurations, connections and controls. The functions and operations of assemblers are well known in the art and coding for test script module 112 would conform to standard assemblers as applied to the programming language used. In the preferred embodiment of system 10, test script files and drivers for instruments from major instrument suppliers, such as National Instruments, Tektronix, Hewlett-Packard and others, are available for the user in configuring a test set. In addition, system 10 includes test script files for standardized components, such as switches, junctions, voltmeters and ammeters, which can be used in developing new instrument drivers or test sets. In developing test script files, the user has the opportunity to create named macros which consist or a number of lines of test script, or the user can make use of macros embedded within test script files already residing within system 10. As with the functions of the system 10 modules, the use of and creation of macros is well known in the art.

The invention thus described is a system for developing program test sets with standardized test hardware utilizing test script to describe instrument configurations, connections and controls. The user chooses the instruments, switches, connections, inputs, outputs, etc. which make up the program test set from listings of standardized components. As each choice is made, the system generates test script corresponding to the choice. The system then uses the test script, or macros of test script, to generate the graphical representation of the component and its connections on the display. The graphical displays are standardized for each functional component or operation of a program test set, as well as being standardized between program test sets. The macros further allow a program test set to be more efficiently developed by coding macros rather than by developing graphical displays. The combined macros or test script files for the entire test set provide written documentation for the program test set, allowing for easy configuration management of the program test set. Once a test set has been developed, the user can run the test set from within the system by having the system execute the test set test script files. The test script is essentially a high level language which is interpreted within system 10 by test script module 112 into the programming language used to control instrument chassis 12. Test script commands are interpreted by test script module 112, converted to the corresponding programming language commands and executed or, in the case of instrument operation, sent to test driver module 200 for execution and interface with instrument chassis 12.

Although the present invention has been described relative to a specific embodiment thereof, it is not so limited. System 10 can be programmed in any well known instrument control or test set development language. Similarly, the file structure and user interface can be changed to suit the operating system of computer 400 and display 500. Further, where instrument chassis 12 is programmable in a language compatible with system 10, driver module 200 can reside within instrument chassis 12. When multiple systems are in use, having driver module 200 reside within chassis 12 allows the use of only one copy of driver module 200 per instrument, rather than one driver module 200 per instrument per system.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system for modeling a process comprising:

a computer interfacing with a system user and receiving keystroke and mouse button inputs from the user;

a display;

at least one test script file describing components, interconnections and steps of the process, the at least one test script file being capable of providing written documentation of the process;

a test executive module having a plurality of operations modules operating within the computer, each one of the plurality of operations modules performing at least one of the operations of interpreting the inputs from the computer, performing operations corresponding to the inputs, processing of the at least one test script file and displaying results of the operations and processing on the display;

an interface module performing the operation of receiving the user inputs, calling the operations modules corresponding to the operations requested by the user inputs and displaying the results of the operations on the display; and a test driver module receiving process control requests from the test executive module, the test driver module interpreting the process control requests, converting the process control requests to process control commands for modeling the process, executing the process control commands and returning process results to the test executive module.

2. The system of claim 1 further comprising a documentation module operating within the computer, monitoring a status of at least one of the test executive module and the test driver module and displaying help information corresponding to the status of at least one of the test executive module and the test driver module when the user input is a help request.

3. The system of claim 1 wherein the test executive module further comprises a password module performing the operations of receiving user name and password inputs, checking the name and password inputs against a password list of the system to determine a user access level and providing the user access to the operations of the test executive module corresponding to the user access level.

4. The system of claim 3 wherein the user access level is determined from a group of clearance levels comprising:

an operator clearance allowing access to operations of the test executive module for performing the process;

a technician clearance allowing access to operations of the test executive module for controlling parameters of the process in addition to the operator clearance access;

a system clearance allowing access to test script files within the test driver module for modifying the process control commands in addition to the technician clearance access; and a developer clearance allowing access to all the operations of the test executive module in addition to the system clearance access.

5. The system of claim 1 wherein the test executive module further comprises a file manager module performing at least one of a group of test script file function operations of the test executive module, the group of test script file function operations including creating a new test script file, opening existing test script files, saving test script files and closing opened test script files.

6. The system of claim 1 wherein the test executive module further comprises a test performance module performing the operation of sequentially executing lines of the test script file and obtaining results data from the execution.

7. The system of claim 6 wherein the test performance module transfers control of the system to the test driver module when the executing line of the test script file requires interpretation and conversion to process control commands.

8. The system of claim 6 wherein the sequential execution of test script file lines is paused after each execution operation to allow for user editing of the test script file.

9. The system of claim 6 wherein the test executive module further comprises a test results module performing the operations of receiving the results data from the test performance module, logging the formatted results data to a log file and formatting the results data for displaying the results data on the display.

10. The system of claim 1 wherein the test executive module further comprises a test results module performing the operations of receiving the process results from the test driver module, logging the results data to a log file and formatting the log file for displaying the results data on the display.

11. The system of claim 1 wherein the user chooses an operating mode of the system from a group of operating modes comprising:

a run mode for performing the process;

an interactive mode allowing the user to additionally change parameters of the process and to modify process control commands; and an edit mode allowing the user to additionally modify test script files.

12. The system of claim 1 wherein the test executive module further comprises a test script module performing the operations of verifying test script files and allowing user editing of test script files.

13. A system for modeling a process comprising:

a computer interfacing with a system user and receiving keystroke and mouse button inputs from the user;

a display;

at least one test script file describing components, interconnections and steps of the process, the at least one test script file being capable of providing written documentation of the process;

a test executive module operating within the computer, interpreting the inputs from the computer, performing operations corresponding to the inputs, processing of the at least one test script file and displaying results of the operations and processing on the display;

a configuration file within the test executive module having a listing of resources and files available to the system;

a resource availability module within the test executive module performing the operations of comparing the listing of resources available with process components, creating a process component availability listing and providing the user with a warning message when process components are missing;

a test script availability module within the test executive module performing the operations of reading all test script files and creating a listing of test script files available to the system;

a driver availability module within the test executive module performing the operations of comparing the process component availability listing and the listing of test script files, creating a listing of test script files available to drive the process components and providing the user with a warning message when test script files are not available to drive a process component; and a test driver module receiving process control requests from the test executive module, the test driver module interpreting the process control requests, converting the process control requests to process control commands for modeling the process, executing the process control commands and returning process results to the test executive module.

14. The system of claim 13 wherein the test executive module further comprises a self test module performing the operations of verifying the existence of all files listed in the configuration file and initiating the resource availability module, the test script availability module and the driver availability module.

15. The system of claim 1 wherein the test driver module operates within the computer.

16. The system of claim 1 wherein the test driver module operates within the process.

17. The system of claim 1 wherein the process is a test set having a plurality of instruments and the test driver module controls the operation of the instruments.

18. A program test set development system comprising:

a computer interfacing with a system user and receiving keystroke and mouse button inputs from the user;

a display;

at least one test script file describing components, interconnections and steps of the test set, the at least one test script file being capable of providing written documentation of the test set;

a password module receiving user name and password inputs, checking the name and password inputs against a password list of the system to determine a user access level and providing the user access to the system corresponding to the user access level;

a file manager module performing at least one of a group of test script file function operations, the group of test script file function operations including creating a new test script file, opening test script files, saving test script files and closing opened test script files;

a test performance module sequentially executing lines of the test script file and obtaining results data from the execution;

a test script module verifying test script files and allowing user editing of test script files;

a configuration file having a listing of resources and files available to the system;

a resource availability module comparing the listing of resources available with test set components, creating a test set component availability listing and providing the user with a warning message when test set components are missing;

a test script availability module reading all test script files and creating a listing of test script files available to the system;

a test driver module receiving test script instrument control strings from the test performance module, the test driver module interpreting the test script instrument control strings, converting the test script instrument control strings to instrument control commands for operating instruments of the test set, executing the instrument control commands and returning test results;

a test results module receiving the test results, logging the test results to a log file and formatting the log file for displaying the test results on the display;

a driver availability module comparing the test set component availability listing and the listing of test script files, creating a listing of test script files available to drive the test set components and providing the user with a warning message when test script files are not available to drive a test set component;

a self test module verifying the existence of all files listed in the configuration file and initiating the resource availability module, the test script availability module and the driver availability module; and a documentation module operating within the computer, monitoring a status of at least one of the system and displaying help information corresponding to the status when the user input is a help request.

19. The system of claim 18 wherein the user access level is determined from a group of clearance levels comprising:

an operator clearance allowing access to the test performance module for performing the test set;

a technician clearance allowing access to edit parameters of the test set in addition to the operator clearance access;

a system clearance allowing access to test script files within the test driver module for modifying the process control commands in addition to the technician clearance access; and a developer clearance allowing access to all modules of the system in addition to the system clearance access.

* * * * *